United States Patent
Shamoto et al.

(10) Patent No.: US 10,723,233 B2
(45) Date of Patent: Jul. 28, 2020

(54) CONTROLLER OF ELECTRICALLY POWERED VEHICLE

(71) Applicant: DENSO CORPORATION, Aichi-pref (JP)

(72) Inventors: Yoshihiro Shamoto, Konan (JP); Kazuhito Hayashi, Inazawa (JP); Hiroyuki Oyanagi, Toyota (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/269,835

(22) Filed: Feb. 7, 2019

(65) Prior Publication Data
US 2019/0248248 A1  Aug. 15, 2019

(30) Foreign Application Priority Data
Feb. 15, 2018  (JP) ................................ 2018-025342

(51) Int. Cl.
| | |
|---|---|
| H02P 23/00 | (2016.01) |
| H02P 25/00 | (2006.01) |
| H02P 27/00 | (2006.01) |
| B60L 15/22 | (2006.01) |
| H02P 27/08 | (2006.01) |
| B60L 15/08 | (2006.01) |
| H02P 23/04 | (2006.01) |
| B60L 15/06 | (2006.01) |

(Continued)

(52) U.S. Cl.
CPC ............... B60L 15/22 (2013.01); B60L 15/06 (2013.01); B60L 15/08 (2013.01); H02P 21/05 (2013.01); H02P 23/04 (2013.01); H02P 27/08 (2013.01); H02P 29/50 (2016.02); B60L 2240/421 (2013.01); H02P 2209/13 (2013.01)

(58) Field of Classification Search
CPC .......... B60L 15/22; B60L 15/06; H02P 29/50
USPC ....................................................... 318/811
See application file for complete search history.

(56) References Cited

U.S. PATENT DOCUMENTS

| | | | |
|---|---|---|---|
| 8,818,596 B2* | 8/2014 | Asami | B60L 11/1803 701/22 |
| 2009/0237019 A1 | 9/2009 | Yamakawa et al. | |

(Continued)

FOREIGN PATENT DOCUMENTS

| | | |
|---|---|---|
| JP | 2013-162660 A | 8/2013 |
| JP | 2017-131094 A | 7/2017 |
| JP | 6221958 A | 10/2017 |

(Continued)

Primary Examiner — Erick D Glass
(74) Attorney, Agent, or Firm — Sughrue Mion, PLLC (57) ABSTRACT

A controller of an electrically powered vehicle includes an electronic control unit. The electronic control unit performs a switching control by a square wave control in a first switching mode when a rotation speed of the motor is equal to or higher than a first predetermined rotation speed. The electronic control unit performs the switching control by the square wave control in a second switching mode when the rotation speed of the motor is lower than the first predetermined rotation speed. The first predetermined rotation speed is a rotation speed lower than a first resonance region. The first switching mode is a mode of a switching pattern that suppresses LC resonance in the first resonance region. The second switching mode is a mode of a switching pattern that suppresses LC resonance in a second resonance region lower than the first predetermined rotation speed.

4 Claims, 6 Drawing Sheets (51) Int. Cl.
*H02P 21/05* (2006.01)
*H02P 29/50* (2016.01)

(56) References Cited

U.S. PATENT DOCUMENTS

2013/0200830 A1    8/2013   Suzuki et al.
2017/0207739 A1    7/2017   Ang et al.

FOREIGN PATENT DOCUMENTS

JP           6221958 B2     10/2017
WO       2015/087700 A1      6/2015

* cited by examiner

CONTROLLER OF ELECTRICALLY POWERED VEHICLE

INCORPORATION BY REFERENCE

The disclosure of Japanese Patent Application No. 2018-025342 filed on Feb. 15, 2018 including the specification, drawings and abstract is incorporated herein by reference in its entirety.

BACKGROUND

1. Technical Field

The present disclosure relates to a controller of an electrically powered vehicle.

2. Description of Related Art

As this type of controller of an electrically powered vehicle, a controller has been hitherto proposed that, when an operating point of a motor falls within a resonance region in which resonance occurs in a booster circuit, performs switching control on switching elements of an inverter by a square wave control method based on a new pulse pattern having three pulses per cycle (e.g., see Japanese Patent Application Publication No. 2017-131094 (JP 2017-131094 A)). The switching control based on this new pulse pattern suppresses LC resonance in the booster circuit at an electrical sixth-order frequency of motor driving electricity by raising the electrical sixth-order frequency.

SUMMARY

The above-described controller of an electrically powered vehicle can suppress LC resonance due to the electrical sixth-order frequency of the motor driving electricity by raising the electrical sixth-order frequency. However, when the electrical sixth-order frequency is raised, a component of a higher-order frequency, such as an electrical 12th-order frequency, increases, so that LC resonance at such a high-order frequency may occur.

The disclosure provides a controller of an electrically powered vehicle that suppress not only resonance due to a low-order frequency component of motor driving electricity but also resonance due to a high-order frequency component thereof.

The controller of an electrically powered vehicle of the present disclosure has adopted the following solutions to achieve the above main object.

A controller of an electrically powered vehicle of the present disclosure is installed in an electrically powered vehicle including a motor for traveling, an inverter that drives the motor, and an electricity storage device that exchanges electricity with the motor through the inverter. The controller includes an electronic control unit that performs switching control on a switching element of the inverter by switching between pulse-width modulation control and square wave control according to a modulation percentage. The electronic control unit performs the switching control by the square wave control in a first switching mode when a rotation speed of the motor is equal to or higher than a first predetermined rotation speed. The electronic control unit performs the switching control by the square wave control in a second switching mode when the rotation speed of the motor is lower than the first predetermined rotation speed. The first predetermined rotation speed is a rotation speed lower than a first resonance region. The first switching mode is a mode of a switching pattern that suppresses LC resonance in the first resonance region. The second switching mode is a mode of a switching pattern that suppresses LC resonance in a second resonance region lower than the first predetermined rotation speed.

The electronic control unit performs switching control on the switching element of the inverter that drives the motor, by switching between the pulse-width modulation control and the square wave control according to the modulation percentage. The electronic control unit performs the switching control by the square wave control in the following manner: When the rotation speed of the motor is equal to or higher than the first predetermined rotation speed lower than the first resonance region, the electronic control unit performs the switching control using the first switching mode of the switching pattern that suppresses LC resonance in the first resonance region. On the other hand, when the rotation speed of the motor is lower than the first predetermined rotation speed, the electronic control unit performs the switching control using the second switching mode of the switching pattern that suppresses LC resonance in the second resonance region lower than the first predetermined rotation speed. Specifically, when the rotation speed is in the first resonance region in which a low-order frequency (e.g., an electrical sixth-order frequency) of motor driving electricity causes LC resonance in an electrical system of the vehicle, the electronic control unit performs the switching control using the first switching mode of the switching pattern that suppresses this LC resonance. Thus, LC resonance due to a low-order frequency can be suppressed. On the other hand, when the rotation speed is in the second resonance region in which a high-order frequency (e.g., an electrical 12th-order frequency or an electrical 24th-order frequency) of the motor driving electricity causes LC resonance in the electrical system of the vehicle, the electronic control unit performs the switching control using the second switching mode of the switching pattern that suppresses this LC resonance. Thus, LC resonance due to a high-order frequency can be suppressed. As a result, it is possible to suppress not only LC resonance due to a low-order frequency component of the motor driving electricity but also LC resonance due to a high-order frequency component thereof.

In the controller of an electrically powered vehicle of the present disclosure, the first switching mode may be a mode of a switching pattern having three or more pulses per cycle, with a first half cycle and a latter half cycle of each cycle having one or more pulses and the first half cycle and a latter half cycle of each cycle having the same number of periods during which voltage polarity is temporarily reversed, and the second switching mode may be a mode of a switching pattern having a larger number of pulses than the first switching mode. In this case, it is assumed that the second switching mode is a mode in which, as in the first switching mode, a first half cycle and a latter half cycle of each cycle has one or more pulses and the same number of periods during which voltage polarity is temporarily reversed.

In the controller of an electrically powered vehicle of the present disclosure, the second switching mode may be a mode of a switching pattern in which a number of pulses and a switching electrical angle are set so as to remove a component of a high frequency of a predetermined order according to an operation state of the motor. The second switching mode may be a mode of a switching pattern that has half-wave symmetry and odd symmetry. For example, a switching pattern that raises a low-order frequency (e.g., the electrical sixth-order frequency) of the motor can be used in the first switching mode, and a switching pattern that further raises a low-order frequency (e.g., the electrical sixth-order frequency) and a high-order frequency (e.g., the electrical 12th-order frequency or the electrical 24th-order frequency) of the motor can be used in the second switching mode.

When the rotation speed of the motor is equal to or higher than a second predetermined rotation speed that is equal to or higher than an upper-limit rotation speed of the first resonance region, the electronic control unit may perform the switching control in a square wave mode of a switching pattern having one pulse per cycle. Thus, the number of times of switching is reduced when the rotation speed of the motor is equal to or higher than the second predetermined rotation speed, so that the switching loss can be reduced and the energy efficiency can be increased.

The electronic control unit may perform the switching control by the square wave control in the first switching mode when the rotation speed of the motor is within the first resonance region. The electronic control unit may perform the switching control in the second switching mode when the rotation speed of the motor is within the second resonance region. The electronic control unit may perform the switching control in a square wave mode when the rotation speed of the motor is outside both the first resonance region and the second resonance region. The square wave mode may be a mode of a switching pattern having one pulse per cycle. Thus, the number of times of switching is reduced when the rotation speed of the motor is outside both the first resonance region and the second resonance region, so that the switching loss can be reduced and the energy efficiency can be increased.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Next, a mode for carrying out the present disclosure will be described using an embodiment.

Figure 1:
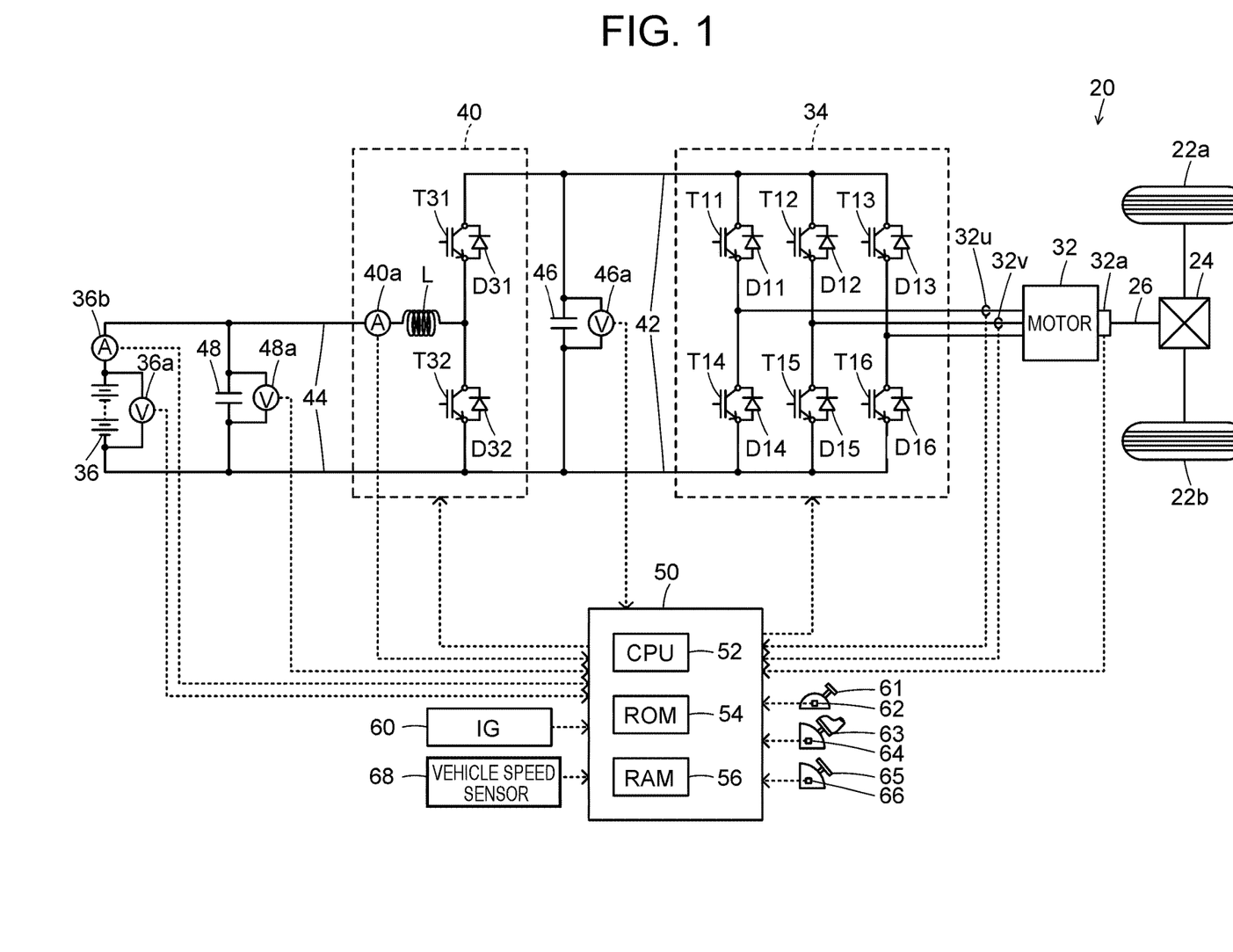
FIG. 1 is a configuration diagram showing an overview of the configuration of an electric vehicle 20 equipped with a controller of an electrically powered vehicle as an embodiment of the present disclosure.

FIG. 1 is a configuration diagram showing an overview of the configuration of an electric vehicle 20 equipped with a controller of an electrically powered vehicle as an embodiment of the present disclosure. The electric vehicle 20 of this embodiment includes, as shown in FIG. 1, a motor 32, an inverter 34, a battery 36 as a power source, a booster converter 40, and an electronic control unit 50.

The motor 32 is configured as a synchronous generator-motor, and includes a rotor in which permanent magnets are embedded and a stator on which three-phase coils are wound. The rotor of the motor 32 is connected to a driving shaft 26 that is coupled to driving wheels 22a, 22b through a differential gear 24.

The inverter 34 is used to drive the motor 32. The inverter 34 is connected to the booster converter 40 through high voltage-side power lines 42, and has six transistors T11 to T16 as switching elements, and six diodes D11 to D16 respectively connected in parallel to the six transistors T11 to T16. The transistors T11 to T16 are disposed in pairs, with each transistor connected at a source side and a sink side respectively to a positive electrode-side line and a negative electrode-side line of the high voltage-side power lines 42. The three-phase coils (U-phase coil, V-phase coil, and W-phase coil) of the motor 32 are respectively connected to connection points of the pairs of the transistors T11 to T16. Thus, as the ratio of an "on" time of the pairs of the transistors T11 to T16 is adjusted by the electronic control unit 50 while a voltage is applied to the inverter 34, a rotating magnetic field is generated in the three-phase coils and the motor 32 is driven to rotate. A smoothing capacitor 46 is mounted across the positive electrode-side line and the negative electrode-side line of the high voltage-side power lines 42.

The battery 36 is configured, for example, as a lithium-ion secondary battery or a nickel-metal hydride secondary battery, and is connected to the booster converter 40 through low voltage-side power lines 44. A smoothing capacitor 48 is mounted across a positive electrode-side line and a negative electrode-side line of the low voltage-side power lines 44.

The booster converter 40 is connected to the high voltage-side power lines 42 and the low voltage-side power lines 44, and has two transistors T31, T32, two diodes D31, D32 respectively connected in parallel to the two transistors T31, T32, and a reactor L. The transistor T31 is connected to the positive electrode-side line of the high voltage-side power lines 42. The transistor T32 is connected to the transistor T31 and to the negative electrode-side lines of the high voltage-side power lines 42 and the low voltage-side power lines 44. The reactor L is connected to a connection point between the transistors T31, T32 and to the positive electrode-side line of the low voltage-side power lines 44. As the ratio of an "on" time of the transistors T31, T32 is adjusted by the electronic control unit 50, the booster converter 40 raises the voltage of electricity in the low voltage-side power lines 44 and supplies this electricity to the high voltage-side power lines 42, or lowers the voltage of electricity in the high voltage-side power lines 42 and supplies this electricity to the low voltage-side power lines 44.

The electronic control unit 50 is configured as a microprocessor centered around a CPU 52, and includes, in addition to the CPU 52, an ROM 54 that stores processing programs, an RAM 56 that temporarily stores data, and input and output ports. Signals from various sensors are input into the electronic control unit 50 through the input port. Examples of the signals input into the electronic control unit 50 include a rotation position θm from a rotation position detection sensor (e.g., a resolver) 32a that detects a rotation position of the rotor of the motor 32, and phase currents Iu, Iv from current sensors 32u, 32v that detect phase currents in the respective phases of the motor 32. Other examples are a voltage Vb from a voltage sensor 36a mounted across terminals of the battery 36, and a current Ib from a current sensor 36b mounted at an output terminal of the battery 36. Further examples are a current IL from a current sensor 40a mounted in series with the reactor L, a voltage VH in the capacitor 46 (high voltage-side power lines 42) from a voltage sensor 46a mounted across terminals of the capacitor 46, and a voltage VL in the capacitor 48 (low voltage-side power lines 44) from a voltage sensor 48a mounted across terminals of the capacitor 48. Additional examples are an ignition signal from an ignition switch 60, and a shift position SP from a shift position sensor 62 that detects an operation position of a shift lever 61. Yet other examples are an accelerator operation amount Acc from an accelerator pedal position sensor 64 that detects an amount of depression of an accelerator pedal 63, a brake pedal position BP from a brake pedal position sensor 66 that detects an amount of depression of a brake pedal 65, and a vehicle speed V from a vehicle speed sensor 68. The electronic control unit 50 calculates a rotation speed Nm of the motor 32 based on the rotation position θm from the rotation position detection sensor 32a, and calculates an electricity storage ratio SOC of the battery 36 based on an integrated value of the current Ib of the battery 36 from the current sensor 36b. Here, the electricity storage ratio SOC is a ratio of the amount of electricity stored in (the amount of electricity that can be discharged from) the battery 36 to the total capacity of the battery 36.

Various control signals are output from the electronic control unit 50 through the output port. Examples of the signals output from the electronic control unit 50 include switching control signals to the transistors T11 to T16 of the inverter 34 and switching control signals to the transistors T31, T32 of the booster converter 40.

In the electric vehicle 20 of the embodiment thus configured, the electronic control unit 50 performs the following running control. In the running control, the electronic control unit 50 sets a required torque Td* required by the driving shaft 26 based on the accelerator operation amount Acc and the vehicle speed V, sets the set required torque Td* as a torque command Tm* for the motor 32, and performs switching control on the transistors T11 to T16 of the inverter 34 such that the motor 32 is driven according to the torque command Tm*. Moreover, in the running control, the electronic control unit 50 sets a target voltage VH* for the high voltage-side power lines 42 such that the motor 32 can be driven according to the torque command Tm*, and performs switching control on the transistors T31, T32 of the booster converter 40 such that the voltage VH in the high voltage-side power lines 42 meets the target voltage VH*.

When performing the running control, the electronic control unit 50 controls the inverter 34 in one control mode of a sinusoidal pulse-width modulation (PWM) control mode, an over-modulation PWM control mode, and a square wave control mode. The sinusoidal PWM control mode is a control mode in which the inverter 34 is controlled such that a pseudo three-phase alternating-current voltage is applied (supplied) to the motor 32. The over-modulation PWM control mode is a control mode in which the inverter 34 is controlled such that an over-modulation voltage is applied to the motor 32. The square wave control mode is a control mode in which the inverter 34 is controlled such that a square wave voltage is applied to the motor 32. The control mode is selected according to the modulation percentage; in order of increasing modulation percentage, the sinusoidal pulse-width modulation (PWM) control mode, the over-modulation PWM control mode, and the square wave control mode are selected. In this embodiment, the sinusoidal pulse-width modulation (PWM) control mode and the over-modulation PWM control mode are collectively referred to as a PWM control mode, as PWM control is performed in both control modes, and the electronic control unit 50 basically performs control by switching between the PWM control mode and the square wave control mode. In this embodiment, to reduce the switching loss of the transistors T11 to T16 of the inverter 34 and increase the energy efficiency, the inverter 34 is controlled in the square wave control mode as far as possible. Specifically, when setting the target voltage VH* for the high voltage-side power lines 42 such that the motor 32 can be driven according to the torque command Tm*, the electronic control unit 50 sets the target voltage VH* such that the modulation percentage corresponds to the square wave control mode as far as possible without affecting the ride comfort etc.

Next, the operation of the electric vehicle 20 of the embodiment, particularly control for suppressing resonance based on a load fluctuation frequency fm of the motor 32 executed by the electronic control unit 50, will be described. The load fluctuation frequency fm of the motor 32 depends on the motor. Resonance occurs when an electrical sixth-order fluctuation frequency or an electrical 12th-order fluctuation frequency belongs to a resonance region of an LC circuit formed by the reactor L of the booster converter 40 and the capacitors 46 in the high voltage-side power lines 42. The electrical sixth-order fluctuation frequency and the electrical 12th-order fluctuation frequency vary linearly relative to the rotation speed Nm of the motor 32. In this embodiment, a region obtained by converting a region in which LC resonance occurs due to the electrical sixth-order fluctuation frequency into a rotation speed of the motor 32 is referred to as a first resonance region, and a region obtained by converting a region in which LC resonance occurs due to the electrical 12th-order fluctuation frequency into a rotation speed of the motor 32 is referred to as a second resonance region.

Figure 2:
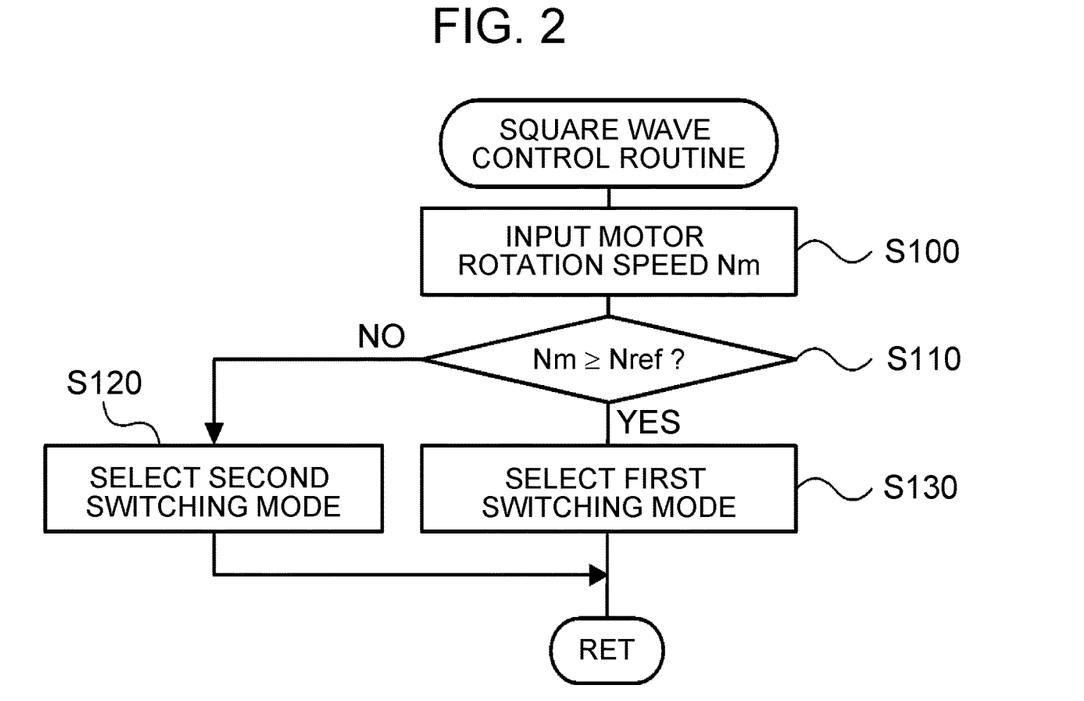
FIG. 2 is a flowchart showing an example of a square wave control routine executed by an electronic control unit 50.

FIG. 2 is a flowchart showing an example of a square wave control routine executed by the electronic control unit 50. This routine is repeatedly executed. When the square wave control routine is started, the electronic control unit 50 first executes a process of inputting the rotation speed Nm of the motor 32 (step S100). As the rotation speed Nm of the motor 32, a rotation speed calculated based on the rotation position θm from the rotation position detection sensor 32a can be input. Then, the electronic control unit 50 determines whether the rotation speed Nm of the motor 32 is equal to or higher than a threshold value Nref (step S110). Here, the threshold value Nref is predetermined as a rotation speed that is lower than the first resonance region and higher than the second resonance region. When the rotation speed Nm of the motor 32 is equal to or higher than the threshold value Nref, the electronic control unit 50 selects switching control in a first switching mode having a switching pattern (pulse pattern) that raises the frequency of an electrical sixth-order fluctuation frequency component (step S130), and ends the current routine. On the other hand, when the rotation speed Nm of the motor 32 is lower than the threshold value Nref, the electronic control unit 50 selects switching control in a second switching mode having a switching pattern (pulse pattern) that raises the frequency of an electrical 12th-order fluctuation frequency component in addition to that of the electrical sixth-order fluctuation frequency component (step S120), and ends the current routine.

Figure 3:
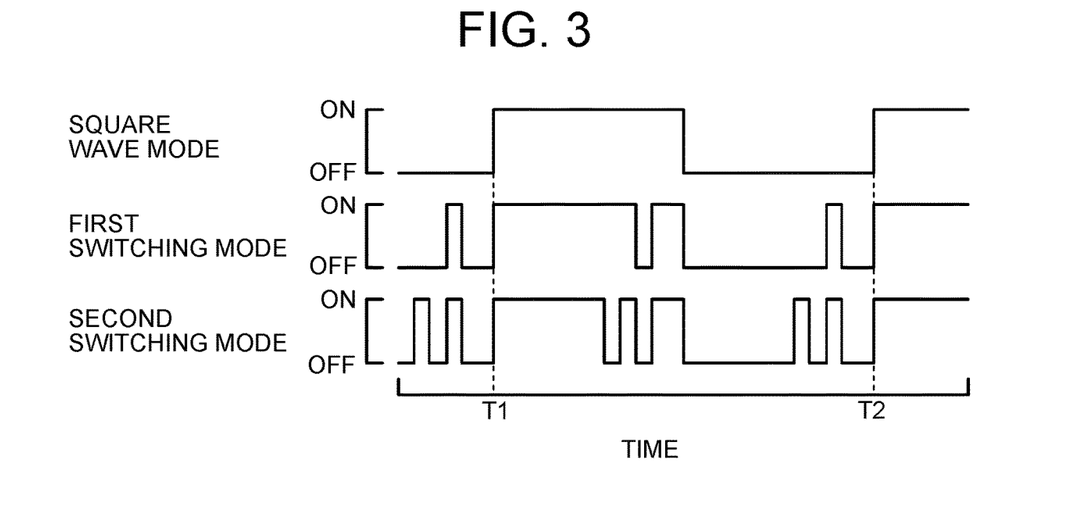
FIG. 3 is a view schematically illustrating an example of pulse patterns in a square wave mode, a first switching mode, and a second switching mode.

FIG. 3 schematically shows an example of the pulse patterns in a square wave mode, the first switching mode, and the second switching mode. The square wave mode is a mode having one pulse per cycle. The first switching mode has a switching pattern in which a first half cycle and a latter half cycle of each cycle has one or more pulses and the same number of periods during which the voltage polarity is temporarily reversed, and which reduces the electrical sixth-order fluctuation frequency component by raising the frequency thereof. Thus, the first switching mode has three or more pulses per cycle, which is a larger number of pulses than in the square wave mode. Details of the first switching mode are described in JP 2017-131094 A. The switching pattern used in the first switching mode that reduces the electrical sixth-order fluctuation frequency component by raising the frequency thereof can be obtained by experiments and created in the form of a table, or can be calculated by computation. The pattern shown in FIG. 3 has a minimum number of pulses, i.e., three pulses, to reduce the switching loss of the transistors T11 to T16. The second switching mode has a switching pattern in which the number and the amplitude of pulses and a switching electrical angle are set so as to remove a component of a high frequency of a predetermined order according to an operating point of the motor 32. In this embodiment, a switching pattern is used that not only reduces the electrical sixth-order fluctuation frequency component by raising the frequency thereof but also reduces the electrical 12th-order fluctuation frequency component by raising the frequency thereof. Thus, the second switching mode has five or more pulses per cycle, which is a larger number of pulses than in the switching pattern of the first switching mode. Details of the second switching mode are described in Japanese Patent Application Publication No. 2013-162660. The switching pattern used in the second switching mode that not only reduces the electrical sixth-order fluctuation frequency component by raising the frequency thereof but also reduces the electrical 12th-order fluctuation frequency component by raising the frequency thereof, can also be obtained by experiments and created in the form of a table, or can be calculated by computation. The pattern shown in this embodiment has a minimum number of pulses, i.e., five pulses, to reduce the switching loss of the transistors T11 to T16. As shown in FIG. 3, the switching patterns of the first switching mode and the second switching mode are created so as to have half-wave symmetry expressed by $f(\omega t) = -f(\omega t + \pi)$ as well as odd symmetry expressed by $f(\omega t) = f(\pi - \omega t)$, where $\omega$ is the angular velocity of the rotor of the motor 32 and t is the time. It is possible to remove harmonic components of even orders and simplify the control by using the limiting condition of half-wave symmetry, and to remove cosine wave components of harmonics by using the limiting condition of odd symmetry.

Figure 4:
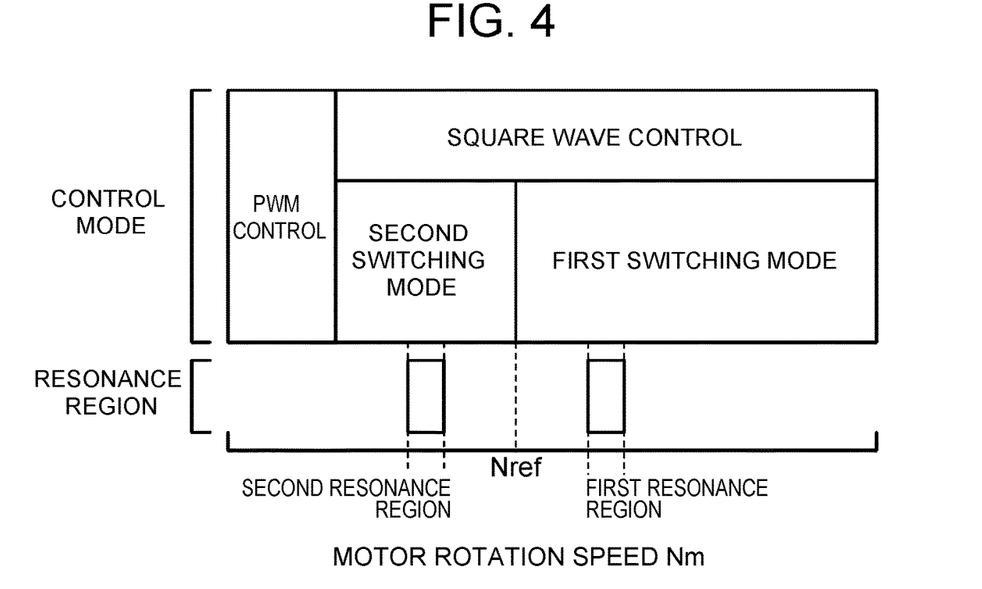
FIG. 4 is a view schematically illustrating a relationship among a rotation speed Nm of a motor 32, control modes, and resonance regions.

FIG. 4 schematically shows a relationship among the rotation speed Nm of the motor 32, the control modes, and the resonance regions. FIG. 4 shows that the PWM control mode and the square wave control mode are switched according to the rotation speed Nm of the motor 32. As described above, the PWM control mode and the square wave control mode are switched according to the modulation percentage, which is determined based on the voltage VH in the high voltage-side power lines 42, the rotation speed Nm of the motor 32, and the torque Tm output from the motor 32. Therefore, it can be understood that FIG. 4 is based on an assumption that the voltage VH in the high voltage-side power lines 42 is constant and the torque Tm output from the motor 32 is also constant. In this embodiment, as shown in FIG. 4, when, in the square wave control mode, the rotation speed Nm of the motor 32 is within a range including the first resonance region and equal to or higher than the threshold value Nref, the electronic control unit 50 performs the switching control in the first switching mode that reduces resonance in the first resonance region (resonance due to the electrical sixth-order fluctuation frequency). Thus, resonance in the first resonance region can be suppressed. On the other hand, when, in the square wave control mode, the rotation speed Nm of the motor 32 is within a range including the second resonance region and lower than the threshold value Nref, the electronic control unit 50 performs the switching control in the second switching mode that reduces resonance in the second resonance region (resonance due to the electrical sixth-order fluctuation frequency and the electrical 12th-order fluctuation frequency). Thus, resonance in the second resonance region can be suppressed.

As has been described above, in the controller installed in the electric vehicle 20 of the embodiment, the electronic control unit 50 performs the switching control in the square wave control mode in the following manner: When the rotation speed Nm of the motor 32 is within the range including the first resonance region and equal to or higher than the threshold value Nref, the electronic control unit 50 performs the switching control in the first switching mode that reduces resonance in the first resonance region (resonance due to the electrical sixth-order fluctuation frequency). Thus, resonance in the first resonance region can be suppressed. On the other hand, when the rotation speed Nm of the motor 32 is within the range including the second resonance region and lower than the threshold value Nref, the electronic control unit 50 performs the switching control in the second switching mode that reduces resonance in the second resonance region (resonance due to the electrical sixth-order fluctuation frequency and the electrical 12th-order fluctuation frequency). Thus, resonance in the second resonance region can be suppressed. As a result, it is possible to suppress not only resonance due to a low-order frequency component of electricity that drives the motor 32 but also resonance due to a high-order frequency component thereof.

Figure 5:
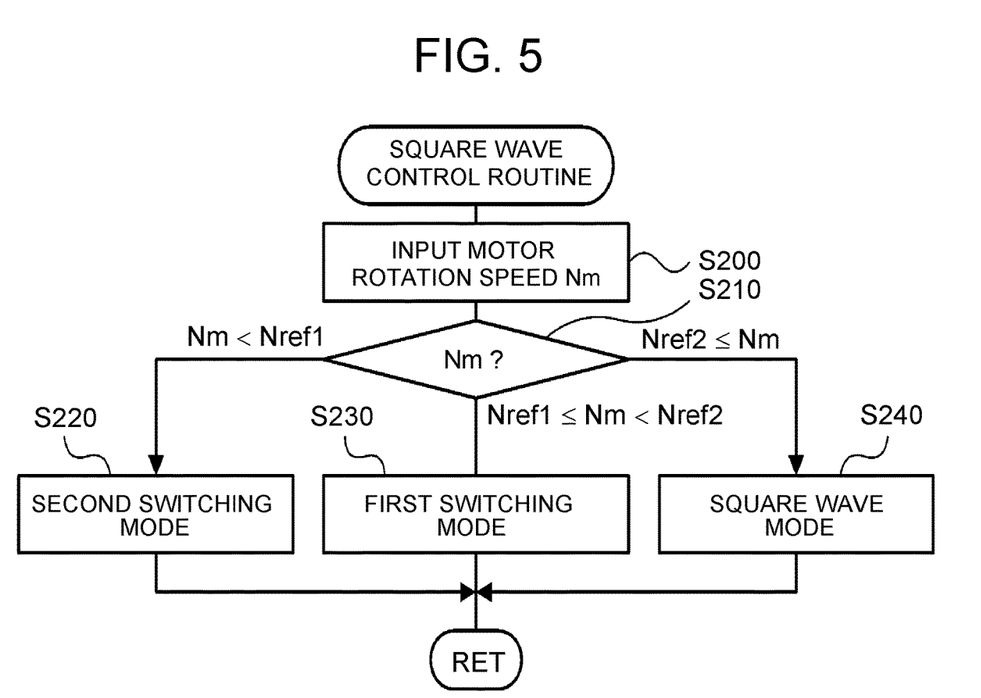
FIG. 5 is a flowchart showing an example of a square wave control routine of a modified example.
Figure 6:
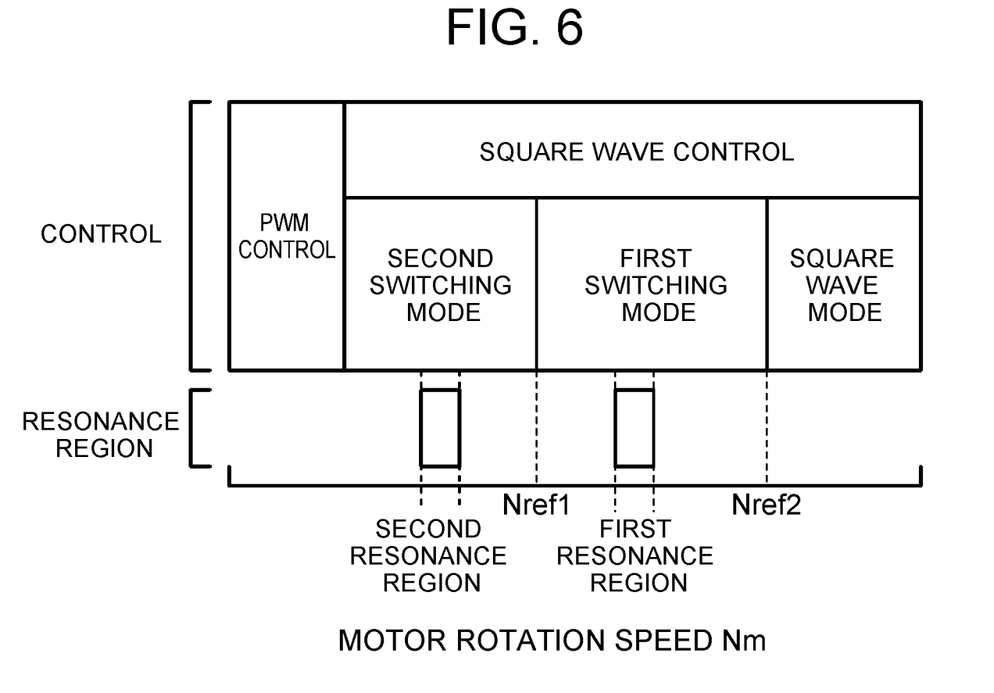
FIG. 6 is a view schematically illustrating a relationship among the rotation speed Nm of the motor 32, control modes, and the resonance regions in the modified example.

In the controller installed in the electric vehicle 20 of the embodiment, the electronic control unit 50 performs the switching control in the square wave control mode in such a manner that, when the rotation speed Nm of the motor 32 is within the range including the first resonance region and equal to or higher than the threshold value Nref, the electronic control unit 50 performs the switching control in the first switching mode, and that, when the rotation speed Nm of the motor 32 is within the range including the second resonance region and lower than the threshold value Nref, the electronic control unit 50 performs the switching control in the second switching mode. Alternatively, the electronic control unit 50 may perform the switching control in the square wave mode (one-pulse pattern) when the rotation speed Nm of the motor 32 is higher than the first resonance region. In this case, the electronic control unit 50 can execute the square wave control routine illustrated in FIG. 5. In the square wave control routine of FIG. 5, the electronic control unit 50 inputs the rotation speed Nm of the motor 32 (step S200), and determines whether the rotation speed Nm is within a region including the second resonance region and lower than a threshold value Nref1, or a region including the first resonance region and equal to or higher than the threshold value Nref1 but lower than a threshold value Nref2, or a region equal to or higher than the threshold value Nref2 that is higher than the first resonance region (step S210). When it is determined that the rotation speed Nm of the motor 32 is within the region including the second resonance region and lower than the threshold value Nref1, the electronic control unit 50 performs the switching control in the second switching mode (step S220), and ends the current routine. When it is determined that the rotation speed Nm of the motor 32 is within the region including the first resonance region and equal to or higher than the threshold value Nref1 but lower than the threshold value Nref2, the electronic control unit 50 performs the switching control in the first switching mode (step S230), and ends the current routine. When it is determined that the rotation speed Nm of the motor 32 is within the region equal to or higher than the threshold value Nref2 that is higher than the first resonance region, the electronic control unit 50 performs the switching control in the square wave mode (step S240), and ends the current routine. FIG. 6 schematically shows a relationship among the rotation speed Nm of the motor 32, the control modes, and the resonance regions in this modified example. Compared with performing the switching control in the first switching mode when the rotation speed Nm of the motor 32 is within the region equal to or higher than the threshold value Nref2 that is higher than the first resonance region, performing the switching control in the square wave mode in this region as in this modified example can reduce the switching loss and increase the energy efficiency.

Figure 7:
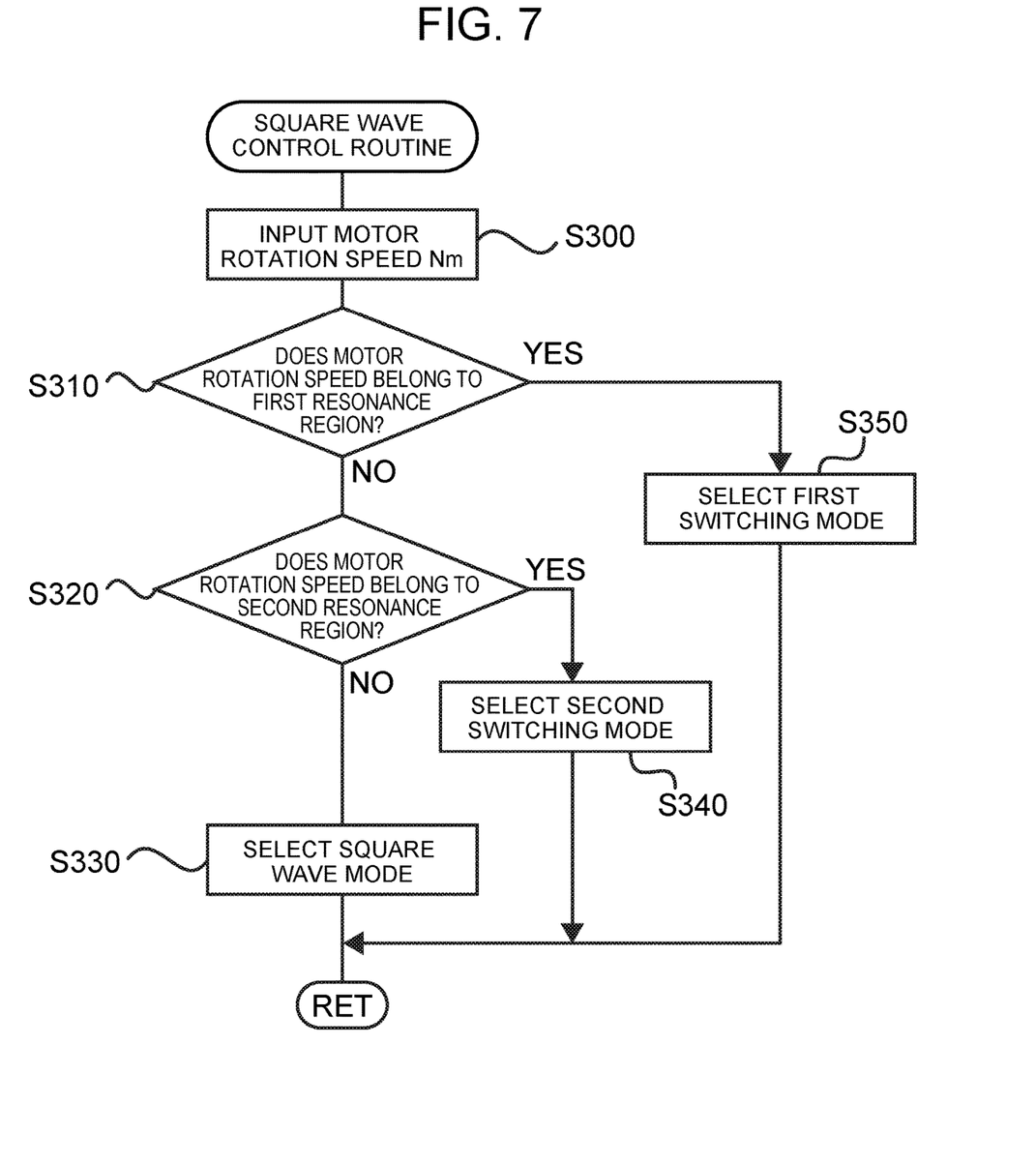
FIG. 7 is a flowchart showing an example of a square wave control routine of a modified example.
Figure 8:
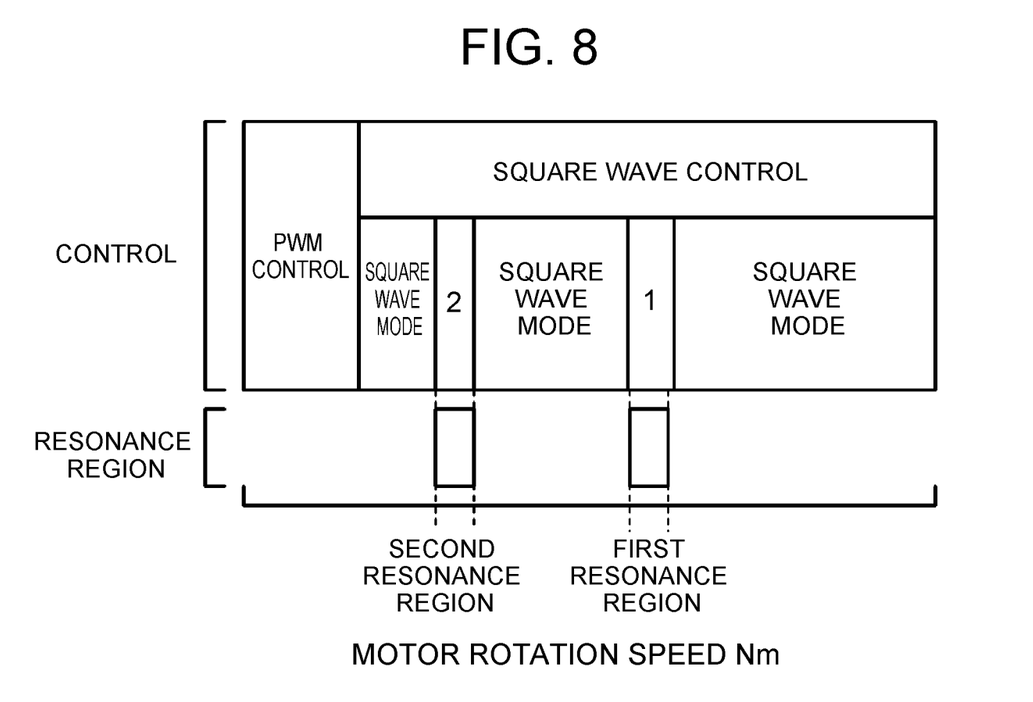
FIG. 8 is a view schematically illustrating a relationship among the rotation speed Nm of the motor 32, the control modes, and the resonance regions in the modified example.

Alternatively, the electronic control unit 50 may perform the switching control in the square wave mode in such a manner that, when the rotation speed Nm of the motor 32 belongs to the first resonance region, the electronic control unit 50 performs the switching control in the first switching mode, and that, when the rotation speed Nm of the motor 32 belongs to the second resonance region, the electronic control unit 50 performs the switching control in the second switching mode, and that, when the rotation speed Nm of the motor 32 belongs to neither the first resonance region nor the second resonance region, the electronic control unit 50 performs the switching control in the square wave mode. In this case, the electronic control unit 50 can execute the square wave control routine of FIG. 7. In the square wave control routine of FIG. 7, the electronic control unit 50 inputs the rotation speed Nm of the motor 32 (step S300), and determines whether the rotation speed Nm belongs to the first resonance region (step S310) or belongs to the second resonance region (step S320). When it is determined that the rotation speed Nm of the motor 32 belongs to neither the first resonance region nor the second resonance region, the electronic control unit 50 performs the switching control in the square wave mode (step S330), and ends the current routine. When it is determined that the rotation speed Nm of the motor 32 belongs to the second resonance region, the electronic control unit 50 performs the switching control in the second switching mode (step S340), and ends the current routine. When it is determined that the rotation speed Nm of the motor 32 belongs to the first resonance region, the electronic control unit 50 performs the switching control in the first switching mode (step S350), and ends the current routine. FIG. 8 schematically shows a relationship among the rotation speed Nm of the motor 32, the control modes, and the resonance regions in this modified example. Compared with performing the switching control in the first switching mode or the second switching mode when the rotation speed Nm of the motor 32 is within a region outside both the first resonance region and the second resonance region, performing the switching control in the square wave mode in this region as in this modified example can reduce the switching loss and increase the energy efficiency.

While the electric vehicle 20 of the embodiment includes the motor 32, the inverter 34, the battery 36, and the booster converter 40, the controller may instead be installed in a vehicle that does not include the booster converter 40. Also in this case, a smoothing capacitor is provided between the battery 36 and the inverter 34, and thus an LC circuit is formed by a reactor component in the circuit (e.g., a reactor component of the battery 36) and the capacitor. Accordingly, resonance occurs when the electrical sixth-order fluctuation frequency or the electrical 12th-order fluctuation frequency belongs to the resonance region of the LC circuit formed by the reactor component and the capacitor. Therefore, this vehicle can be controlled in the same manner as in the embodiment or the modified examples thereof to suppress resonance due to a low-order frequency component of electricity that drives the motor 32 as well as resonance due to a high-order frequency component thereof.

While the electric vehicle 20 of the embodiment includes the single motor 32 and the inverter 34 that drives the motor 32, the controller may instead be installed in a vehicle that includes a plurality of motors 32 and a plurality of inverters that respectively drive these motors. In this case, with a region of resonance due to an electrical sixth-order fluctuation frequency component of each motor defined as the first resonance region, and with a region of resonance due to an electrical 12th-order fluctuation frequency component of each motor defined as the second resonance region, the square wave control routine of the embodiment or the modified examples can be executed for each motor.

While the battery 36 is used as the electricity storage device in the electric vehicle 20 of the embodiment, any device that can store electricity, for example, a capacitor, may be used.

The controller is installed in the electric vehicle 20 including the motor 32 in the embodiment. However, the controller may instead be installed in a hybrid electric vehicle including an engine in addition to the motor 32.

The correspondence relationship between the main components of the embodiment and the main components of the disclosure described in SUMMARY is as follows: The motor 32, the inverter 34, the battery 36, and the electronic control unit 50 in the embodiment are examples of the motor, the inverter, the electricity storage device, and the electronic control unit, respectively.

While the mode for carrying out the present disclosure has been described above using the embodiment, it should be understood that the present disclosure is in no way limited to such an embodiment but can be implemented in various modes within the scope of the gist of the disclosure.

The present disclosure is applicable, for example, to an industry that manufactures controllers of electrically powered vehicles.

What is claimed is:

1. A controller of an electrically powered vehicle, the controller being installed in the electrically powered vehicle including a motor for traveling, an inverter that drives the motor, and an electricity storage device that exchanges electricity with the motor through the inverter, the controller comprising an electronic control unit configured to perform switching control on a switching element of the inverter by switching between pulse-width modulation control and square wave control according to a modulation percentage, wherein
the electronic control unit is configured to perform the switching control by the square wave control in a first switching mode when a rotation speed of the motor is equal to or higher than a first predetermined rotation speed, the electronic control unit is configured to perform the switching control by the square wave control in a second switching mode when the rotation speed of the motor is lower than the first predetermined rotation speed, the first predetermined rotation speed is a rotation speed lower than a first resonance region, the first switching mode is a mode of a switching pattern that suppresses LC resonance in the first resonance region, and the second switching mode is a mode of a switching pattern that suppresses LC resonance in a second resonance region lower than the first predetermined rotation speed, wherein the first switching mode is a mode of a switching pattern having three or more pulses per cycle, with a first half cycle and a latter half cycle of each cycle having one or more pulses and the first half cycle and the latter half cycle of each cycle having the same number of periods during which voltage polarity is temporarily reversed, and the second switching mode is a mode of a switching pattern having a larger number of pulses than the first switching mode.

2. The controller of the electrically powered, vehicle according to claim 1, wherein the second switching mode is a mode of a switching pattern in which a number of pulses in a predetermined cycle and a switching electrical angle are set so as to remove a component of a high frequency of a predetermined order according to an operation state of the motor, and the second switching mode is a mode of a switching pattern having half-wave symmetry and odd symmetry.

3. The controller of the electrically powered vehicle according to claim 1, wherein when the rotation speed of the motor is equal to or higher than a second predetermined rotation speed that is equal to or higher than an upper-limit rotation speed of the first resonance region, the electronic control unit is configured to perform the switching control in a square wave mode of a switching pattern having one pulse per cycle.

4. A controller of an electrically powered vehicle, the controller being installed in the electrically powered vehicle including a motor for traveling, an inverter that drives the motor, and an electricity storage device that exchanges electricity with the motor through the inverter, the controller comprising an electronic control unit configured to perform switching control on a switching element of the inverter by switching between pulse-width modulation control and square wave control according to a modulation percentage, wherein the electronic control unit is configured to perform the switching control by the square wave control in a first switching mode when a rotation speed of the motor is equal to or higher than a first predetermined rotation speed, the electronic control unit is configured to perform the switching control by the square wave control in a second switching mode when the rotation speed of the motor is lower than the first predetermined rotation speed, the first predetermined rotation speed is a rotation speed lower than a first resonance region, the first switching mode is a mode of a switching pattern that suppresses LC resonance in the first resonance region, and the second switching mode is a mode of a switching pattern that suppresses LC resonance in a second resonance region lower than the first predetermined rotation speed, wherein the electronic control unit is configured to perform the switching control by the square wave control in the first switching mode when the rotation speed of the motor is within the first resonance region, the electronic control unit is configured to perform the switching control by the square wave control in the second switching mode when the rotation speed of the motor is within the second resonance region, and the electronic control unit is configured to perform the switching control by the square wave control in a square wave mode when the rotation speed of the motor is outside both the first resonance region and the second resonance region, the square wave mode is a mode of a switching pattern having one pulse per cycle.

* * * * *